March 8, 1932. G. M. SOULE 1,848,278
TRANSMISSION GEARING
Filed June 29, 1927
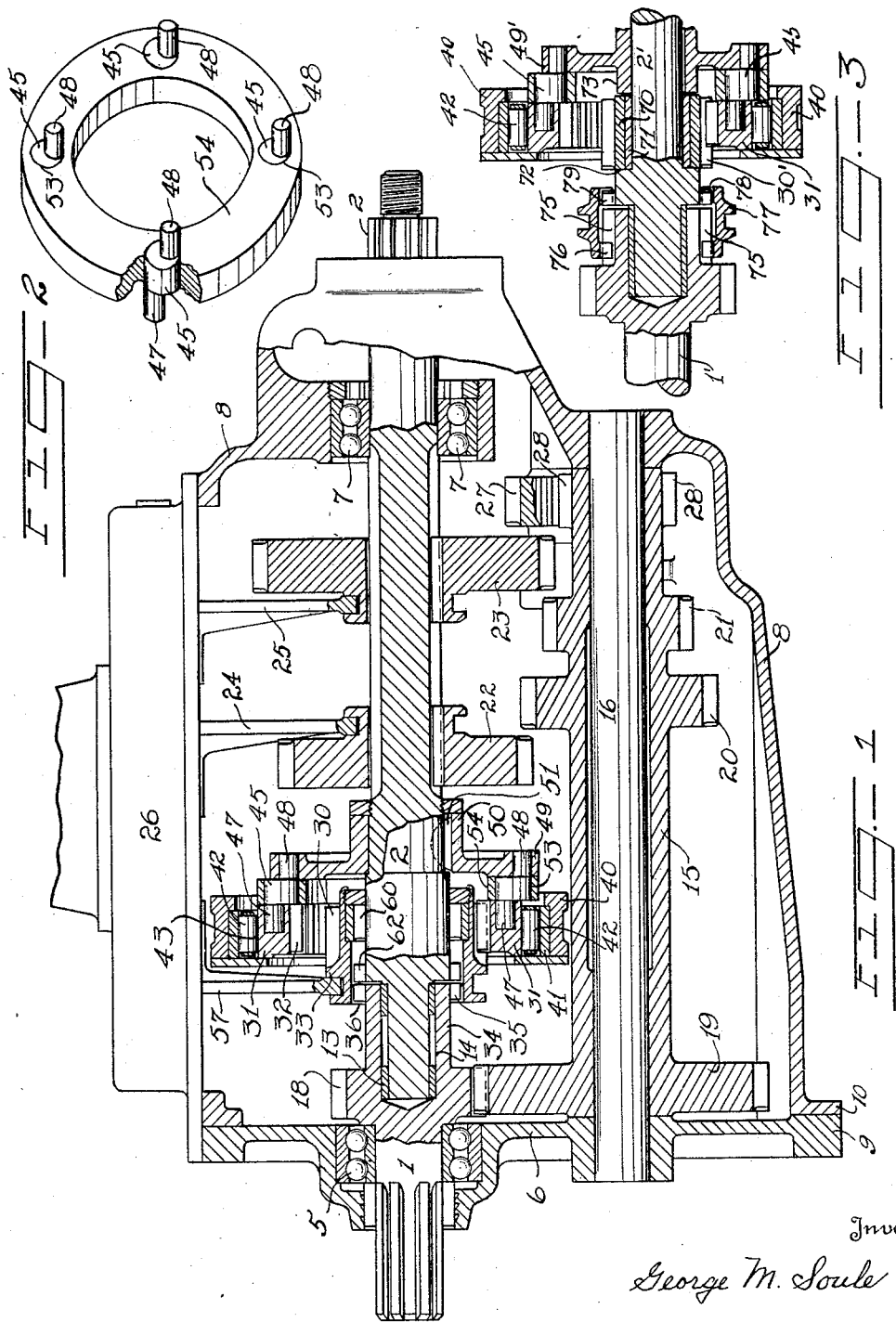

Patented Mar. 8, 1932

1,848,278

UNITED STATES PATENT OFFICE

GEORGE M. SOULE, OF CLEVELAND, OHIO, ASSIGNOR TO AUTOMOTIVE PATENT HOLDING COMPANY, OF CLEVELAND, OHIO, A CORPORATION OF DELAWARE

TRANSMISSION GEARING

Application filed June 29, 1927. Serial No. 202,282.

This invention relates to transmission gearing, of a type similar in some respects to the gearing shown in the prior application of Charles E. F. Ahlm, Serial No. 153,544, filed December 9th, 1926, and with characteristics in common with the disclosure of the prior application of George M. Soule, Serial No. 133,524, filed September 4th, 1926.

In the gearing shown in the first mentioned prior application a double set of internally and externally meshing gears are used to obtain a quietly operating geared connection between two aligned shafts in addition to the usual direct drive connection which is of course quiet, thus providing two quiet speeds for the transmission. This arrangement is incorporated in a complete transmission unit capable of affording other speeds by the use of spur gears, including reverse drive.

The second mentioned application shows an arrangement employing a single set of internally and externally meshing gears for obtaining a quiet speed in addition to direct. The gearing is arranged as an auxiliary unit and the internal-external gears afford either over-speed or under-speed drive, depending upon which shaft is driven.

The present invention embodies the general principle disclosed in the second mentioned prior application, but the elements are arranged for greater compactness and in such manner that the single set of internally and externally meshing gears may be incorporated in a gearing of the standard type at comparatively low cost.

The primary elements of the gearing herein shown comprise, a pair of aligned shafts arranged to be directly connected as by a sliding dental clutch, and an internally toothed ring on an eccentric axis and arranged in direct driving relation to one of the shafts. The other shaft is connected to the ring through an external pinion.

Two arrangements for establishing the connection through the internal and external gears are shown. In one arrangement the pinion slides into and out of mesh with the internal gear, and in the other the internal and external gears are in constant mesh.

In the drawings, Fig. 1 is a substantially central longitudinal section through one form of the gearing; Fig. 2 is a perspective view of the primary elements of the direct connecting means between the internally geared ring and one of the shafts; and Fig. 3 is a fragmentary view similar to Fig. 1 of a modified form of the gearing, wherein the internal and external gears are in constant mesh.

Referring in detail to the drawings, 1 is the drive shaft, and 2 the driven shaft of the garing. The drive shaft is adapted to be connected as by means of the usual main clutch to the engine shaft, and the shaft 2 to the usual propeller shaft, no special connections being shown. The shaft 1 may be supported by a bearing 5 in a casing section 6 and the shaft 2 in a bearing 7 in a casing section 8. The two casing sections may be connected together as by the usual flanges 9 and 10 on the respective casing sections to form a complete housing. One shaft is arranged to support the other close to one of the main bearings as by a pilot bearing 13 seated in a recess 14 at the rear end of the shaft 1. A counter-shaft of the quill type is shown at 15 supported on a rigid bar 16 which is in turn supported at its ends by the casing sections 6 and 8. The counter-shaft is shown as drivingly connected at all times to the shaft 1 by means of a small spur gear 18 rigid on the shaft 1, and a larger gear 19 rigid on the counter-shaft. The counter-shaft has two rigid gears 20 and 21 engageable by respective sliding gears 22 and 23 splined onto the shaft 2. The gears 22 and 23 may be shifted into and out of mesh with the cooperating gears by the usual arrangement of shipper forks 24 and 25 engaging respective grooves in the hubs of the gears, the forks being mounted on striker bars (not shown) contained in a casing member 26. When the teeth 21 and 23 are in mesh the gearing delivers power at low speed because the gear 18 is smaller than the gear 19 and the gear 23 is smaller than the gear 21. When the gears 20 and 22 are drivingly active the gearing delivers power at a higher speed because the gear 20 is larger, in proportion to its cooperating gear, than the gear 21. Reverse drive may be afforded by reason of an idler 27 in constant mesh with a gear 28 rigid on the counter-shaft, the former being engageable by the sliding gear 23. The arrangement of spur gears and counter-shaft is old, and may be considerably modified in practice.

Ordinarily in automobile transmissions three speeds are used, the high speed being afforded when the shafts, such as at 1 and 2 are connected directly together. In the present gearing a slightly lower speed than high is afforded by means of an external pinion 30 capable of being made drivingly rigid with the shaft 1, and an internally geared ring 31 directly connected to the shaft 2, and having internal teeth 32 with which the pinion 30 is adapted to mesh. Because of the internal and external tooth engagement, this speed, intermediate, second and high, is comparatively quiet and may be used entirely for ordinary driving at moderate speeds to thereby decrease the strain on the engine. This is the underlying principle of the Ahlm gearing arrangement mentioned.

The pinion 30 is mounted, as shown in Fig. 1, on a slidable member 33 supported at one end on the shaft 2 and at the other end on an extension 34 of the shaft 1. At the rear end of the extension 34 are clutch teeth 35 shown as engaged by internal clutch teeth 36 on the member 33. With the member 33 in the position shown, the shaft 1 drives the shaft 2 through the internal and external gears.

The internally toothed ring 31 may be rigidly supported eccentric to the shaft 2 by a bracket 40 carried by the casing section 8 and preferably forming an integral part thereof. The bearing for the ring 31 comprises, as shown, an outer bearing race member 41, and a single set of rollers 42 contained in the race member and bearing against the outer peripheral surface 43 of the ring. The arrangement for directly connecting the ring to the shaft 2 comprises a series of links 45 having off-set parallel projections 47 and 48. The offset of the axes of the projections corresponds to the eccentricity of the ring 31 to the shaft 2. The projections 47 engage parallel recesses in the rear side of the ring 31, and the projections 48 engage recesses in a flange 49 having a hub 50 keyed onto the shaft 2 as at 51, or otherwise rigidly secured to the shaft. The members 45 afford a driving connection between the ring 31 and the flange 49, because each may turn entirely around once for every revolution of the shaft 2.

In order to minimize strain on the links, the links have their central portions cylindrically formed to engage circular openings 53 in an annular plate 54 which travels around with the links on an axis intermediate the axis of the ring 31 and that of the shaft 2. The plate serves to absorb lateral strain on the links such as would tend to wear the portions 47 and 48 or the adjacent surfaces of the toothed ring and the plate.

Direct drive or high is afforded when the member 33 is shifted forwardly from the position shown, as by means of a shipper fork 57. As the member 33 is moved forwardly the teeth 35 and 36 are separated (for neutral) and further forward movement carries an internally toothed ring 60, freely mounted within the rear end of the member 33, into bridging contact with the teeth 35 and a similarly formed set of teeth 62 rigid with the shaft 2. In the arrangement shown in Fig. 1, the teeth 30 and 32 are entirely separated when the direct connection is established thereby eliminating all gear noise and possible tooth wear, so far as the internal and external gears are concerned, while driving direct.

When the member 33 is again moved rearwardly past the neutral point, to establish the driving connection through the internal and external gears, it will be noted that the gear teeth are meshed before the clutch teeth 35 and 36 are brought together to complete the connection. This meshing between the gear teeth is not accompanied by clash or strain on the teeth because only the weight of the member 33 has to be picked up at the time. Further rearward movement of the member 33 to slide the teeth 30 into full engagement as shown couples the clutch teeth 35 and 36.

In the modification shown in Fig. 3 the teeth corresponding to the small external gear previously described are carried by a member 70, the teeth being designated 30'. This member 70, as shown, is journaled for relative rotation to the shaft 2, as on a bearing 71, and may be held in longitudinally fixed position between a shoulder 72 on the shaft and a cylindrical projection 73 from the flanged member 49'. The link arrangement and the internally toothed ring are shown substantially as in the embodiment of Fig. 1, and the parts are similarly numbered. The drive shaft 1' has elongated teeth 75 at its rear end slidably engaged by internal teeth 76 on a clutch ring 77. The rear end of the clutch ring has internal teeth 78 engageable selectively with external teeth 79 on the forward end of the shaft 2' and with the forwardly extended teeth 30'. This arrangement permits the internal and external teeth to be in constant mesh at all times, the external toothed carrying member 70 simply running idly on the bearing 71 when the direct connection is established or when the teeth 78 are between the teeth 79 and 30' for neutral.

I claim:—

1. In a gearing, a pair of aligned shafts, a gear mounted coaxially with the shafts, means to interruptably connect the same to one of the shafts in one to one ratio, an annular member on a permanently fixed axis eccentric to the shaft axes and having teeth adapted to mesh with the teeth of said gear, said annular member having a direct driving connection with the other shaft, comprising a plurality of links having offset projections, certain of the projections engaging the annular member, and a member having a connection with said other shaft and having recesses to engage the remainder of said projections.

2. In a gearing, a pair of aligned shafts, clutch members respectively carried by the shafts, an annular gear mounted on a permanently fixed eccentric axis and having a constant driving connection with one of the shafts, a shiftable member having clutch means adapted to coact with the clutch member of the other shaft, said shiftable member having gear teeth to, at such time, mesh with the teeth of the said gear, and a clutch member movable with said first mentioned member and capable of rotation relative thereto and arranged to connect the first mentioned sets of clutch members together when the said shiftable member is moved axially to a predetermined position.

3. In a gearing, a pair of aligned shafts, means for connecting the shafts directly together for direct drive, and means for connecting the shafts for relative rotation comprising a gear coaxial with the shafts and adapted to be driven directly by one of the shafts, and an annular gear member on a fixed eccentric axis and having teeth adapted to mesh with the said gear, said annular member having a direct driving connection with the other shaft, said direct driving connection comprising links having oppositely extending off-set projections, there being means rigid with a shaft to receive one set of projections, the other set engaging the annular member, and rigid means forming a bearing support for the links intermediately of the ring and the said means rigid with the shaft.

4. In a gearing, a pair of axially aligned shafts, a casing therefor, a gear mounted coaxially with the shafts, means to interruptably connect the gear to one of the shafts in one to one ratio, an annular gear member in surrounding relation to one of the shafts and having internal teeth for meshing with the aforesaid gear, means for supporting the annular gear member on a fixed axis eccentric to the shafts and parallel therewith including a fixed part of the casing substantially surrounding the annular gear member, a direct one to one ratio driving connection between the annular gear member and the other shaft, whereby when the first named gear is connected to one shaft as aforesaid, the mechanism will function to connect the shafts for relative speed, there being clutch means to connect the shafts to each other in one to one ratio for a direct driving condition of the gearing.

5. In a multiple speed gearing, a pair of aligned shafts, means to connect the shafts in one to one ratio for direct drive, a pinion adapted for connection to one of the shafts, an internal gear drivingly associated with the pinion, and means to connect the internal gear to the other shaft, the last named means comprising a plurality of eccentric links having oppositely disposed axially off-set projections for connection to the gear and said other shaft, there being a support for the links comprising a revoluble frame and supporting bearings for all the links in said frame adapted to engage the links between the respective projections thereof to hold the links in parallel arrangement.

In testimony whereof, I hereunto affix my signature.

GEORGE M. SOULE.